United States Patent [19]

Muehllehner

[11] Patent Number: 5,777,331
[45] Date of Patent: Jul. 7, 1998

[54] TOMOGRAPHIC EMISSION SCANNER HAVING OFFSET HIGH DETECTION EFFICIENCY AREA

[75] Inventor: Gerd Muehllehner, Wayne, Pa.

[73] Assignee: UGM Laboratory, Inc., Philadelphia, Pa.

[21] Appl. No.: 754,357

[22] Filed: Nov. 22, 1996

[51] Int. Cl.$^6$ .................................................. G01T 1/164
[52] U.S. Cl. ................................. 250/363.03; 250/366
[58] Field of Search .................. 250/363.03, 363.04, 250/363.02, 366

[56] References Cited

U.S. PATENT DOCUMENTS

| | | | |
|---|---|---|---|
| 4,095,107 | 6/1978 | Genna et al. | 250/363 |
| 4,213,054 | 7/1980 | Doherty, III | 250/363.04 |

*Primary Examiner*—Don Wong
*Attorney, Agent, or Firm*—Panitch Schwarze Jacobs & Nadel, P.C.

[57] ABSTRACT

A tomographic emission scanner has a detection chamber with an axial center line and an axial periphery, a positron emission coincidence detection circuit, and a number of positron emission detector units that are positioned around the axial periphery of the detection chamber. Each detector unit is operatively coupled to the detection circuit and has a detection face oriented toward the detection chamber. Each detector unit is circumferentially movable about the axial periphery of the detection chamber. In one embodiment, at least one of the detector units is independently movable with respect to any other detector unit. In another embodiment, the scanner also has a resting surface at least partially positioned within the detection chamber. The resting surface extends parallel to and is radially movable with respect to the axial center line. The resting surface is also circumferentially movable with respect to the axial center line while continuously facing upward.

28 Claims, 4 Drawing Sheets

TO DET. CIR. 25

TOMOGRAPHIC EMISSION SCANNER HAVING OFFSET HIGH DETECTION EFFICIENCY AREA

BACKGROUND OF THE INVENTION

The present invention relates generally to a tomographic emission scanner having a high detection efficiency area that is offset from the axial midpoint of a body within a scanner detection chamber. More particularly, the present invention relates to a positron-emission tomography (PET) scanner wherein the high detection efficiency area is defined according to the relative placement of a number of positron emission detector units around the axial periphery of the scanner detection chamber and/or a movable patient resting surface.

As is known, tomography is a radiographic technique for imaging a section of a body. Accordingly, a predetermined plane of the body may be shown in detail. Forms of tomography include computerized axial tomography (CAT), magnetic resonance imaging (MRI) tomography, and positron-emission tomography (PET), among others.

In positron-emission tomography in particular, [$^{18}$F]-fluorodeoxyglucose ($^{18}$F-FDG) is commonly introduced into at least a part of the body, and positron emissions from the $^{18}$F-FDG within the body are detected to form the planar sections. More specifically, each emitted positron travels a short distance, combines with an electron, and is annihilated. The resulting energy is carried by two photons with an energy of 511 keV, each of which travels in nearly opposite directions. Accordingly, simultaneous detection (i.e., coincidence detection) of the two photons signals the decay of a positron ("an event") anywhere along a line connecting the two points of detection. Typically, crystal detectors are employed to detect the photons. A more detailed discussion of positron-emission tomography is set forth in *Progress in Medical Imaging*, Vernon L. Newhouse, Ed., Ch. 4: Positron-Emission Tomography, Joel S. Karp and Gerd Muehllehner, Springer-Verlag, New York, 1988, hereby incorporated by reference.

In a first type of prior art PET scanner, a number of emission detector units are fixedly positioned around substantially the entire axial periphery of a detection chamber to detect emitted photons. With such an arrangement, any two opposing photons emitted from an object within the detection chamber can be found in coincidence. However, the number of emission detectors in the first type of PET scanner is typically six or more, and each emission detector is relatively costly.

In a second type of prior art PET scanner, only two of the relatively costly emission detectors are employed such that substantial gaps of coverage exist around the axial periphery of a detection chamber. In particular, in the second type of PET scanner, the two emission detectors are opposingly situated with respect to the detection chamber (i.e., 180 degrees apart from each other), and both emission detectors are rotated around the detection chamber. Although the substantial gaps of coverage prevent all emitted opposing photons from being found in coincidence, it can be assumed that enough photons are found in coincidence to collect a complete dataset. However, a problem exists in connection with the second type of PET scanner in that the opposing pair of emission detectors tends to sense a relatively high number of events adjacent the axial center of the detection chamber, and relatively decreasing numbers of events farther away from such axial center. Put another way, the uniformity of detection or "detection efficiency" of any region within the detection chamber of the second type of PET scanner decreases the farther away such region is from the axial center of the detection chamber.

As should be understood, the decrease in efficiency toward the periphery of the detection chamber decreases the image quality of a PET scan performed with the rotating opposing detectors. A need exists, then, for a rotating opposing detector PET scanner having improved detection efficiency in areas away from the axial center of the detection chamber. More specifically, a need exists for a PET scanner that has a high detection efficiency area that is offset from the axial midpoint of a body within a scanner detection chamber.

BRIEF SUMMARY OF THE INVENTION

In one embodiment of the present invention, the aforementioned need is satisfied by a tomographic emission scanner having detector units that are independently movable with respect to each other. More particularly, in the embodiment, a positron emission coincidence detection scanner has a detection chamber with an axial center line and an axial periphery, a positron emission coincidence detection circuit, and a number of positron emission detector units that are positioned around the axial periphery of the detection chamber. Each detector unit is operatively coupled to the detection circuit and has a detection face oriented toward the detection chamber. Each detector unit is circumferentially movable about the axial periphery of the detection chamber, and at least one of the detector units is independently movable with respect to any other detector unit.

In another embodiment of the present invention, the aforementioned need is satisfied by a tomographic emission scanner having a circumferentially movable resting surface. More particularly, such scanner has a detection chamber with an axial center line and an axial periphery, a positron emission coincidence detection circuit, a resting surface at least partially positioned within the detection chamber, and a number of positron emission detector units positioned around the axial periphery of the detection chamber. The resting surface extends substantially parallel to the axial center line of the detection chamber and is radially movable with respect to the axial center line of the detection chamber. The resting surface is also circumferentially movable with respect to the axial center line of the detection chamber while continuously facing substantially upward. Each detector unit is operatively coupled to the detection circuit and has a detection face oriented toward the detection chamber.

BRIEF DESCRIPTION OF THE SEVERAL VIEWS OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
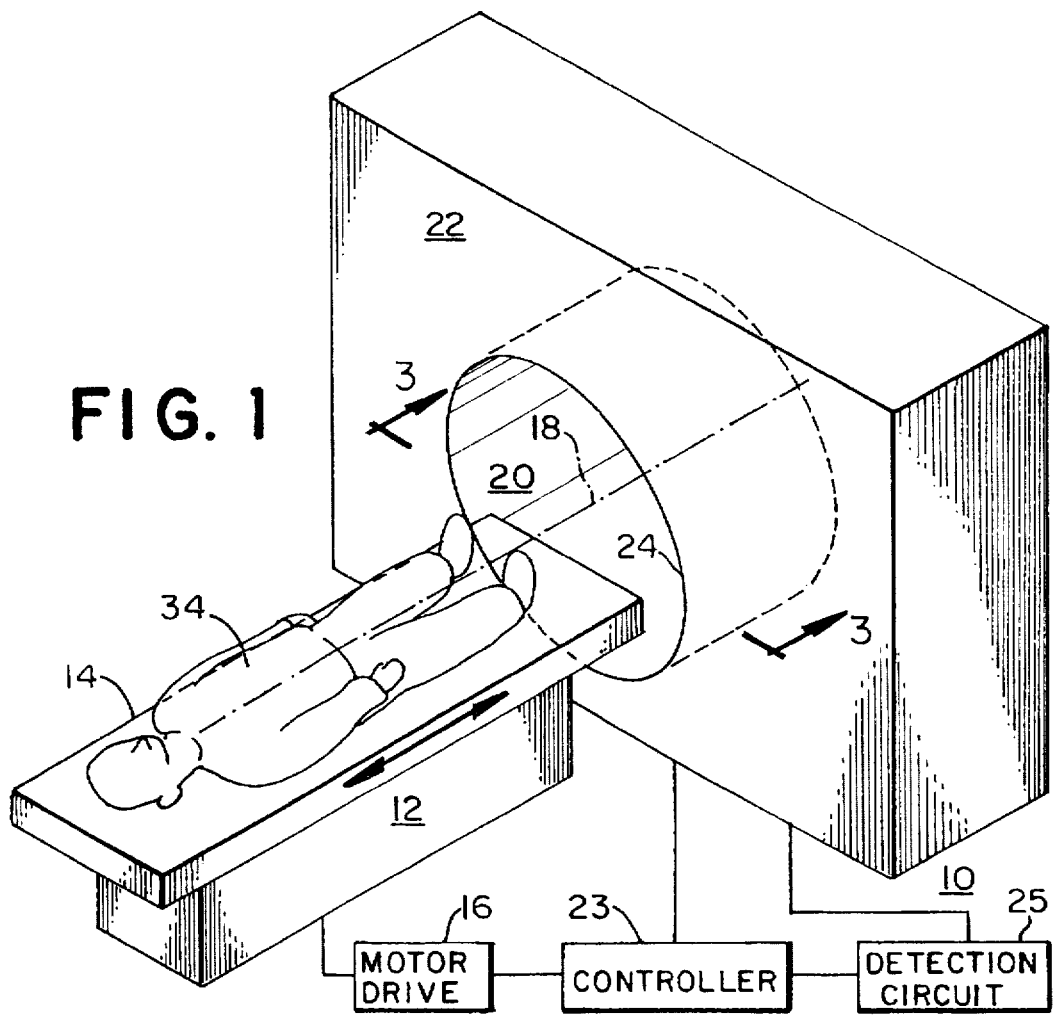
FIG. 1 is a perspective view of a positron-emission tomographic (PET) scanner apparatus in accordance with the present invention.

Certain terminology may be used in the following description for convenience only and is not limiting. The words "left", "right", "upper", and "lower" designate directions in the drawings to which reference is made. The words "inwardly" and "outwardly" are further directions toward and away from, respectively, the geometric center of a referenced object. The terminology includes the words above specifically mentioned, derivatives thereof, and words of similar import.

Referring to the drawings in detail, wherein like numerals are used to indicate like elements throughout, there is shown in FIG. 1 a positron-emission tomography (PET) scanner apparatus 10 in accordance with a first preferred embodiment of the present invention. As seen, the apparatus 10 includes a patient bed 12 upon which a body 34 of a patient (shown in phantom) typically rests during a PET scanning procedure. As should be understood, the patient bed 12 includes a longitudinally extending patient support surface or patient resting surface 14 which is movable by an appropriate motor drive 16 along (i.e., parallel to) an axial line 18.

The apparatus 10 also includes a detection gantry 22 and a detection chamber 20 formed within the detection gantry 22. As seen, the detection chamber 20 has an inner axial periphery 24 defined by the detection gantry 22. Preferably, the axial line 18 along which the patient resting surface 14 moves is the axial center line 18 of the detection chamber 20. As should be understood, at least a portion of a body 34 resting on the surface 14 is moved into the detection chamber 20 during a PET scanning procedure. Preferably, the axial center line 18, the detection chamber 20, and the patient resting surface 14 are substantially horizontally oriented, although one skilled in the art will appreciate that such elements may be oriented in other positions without departing from the spirit and scope of the present invention.

Figure 2A:
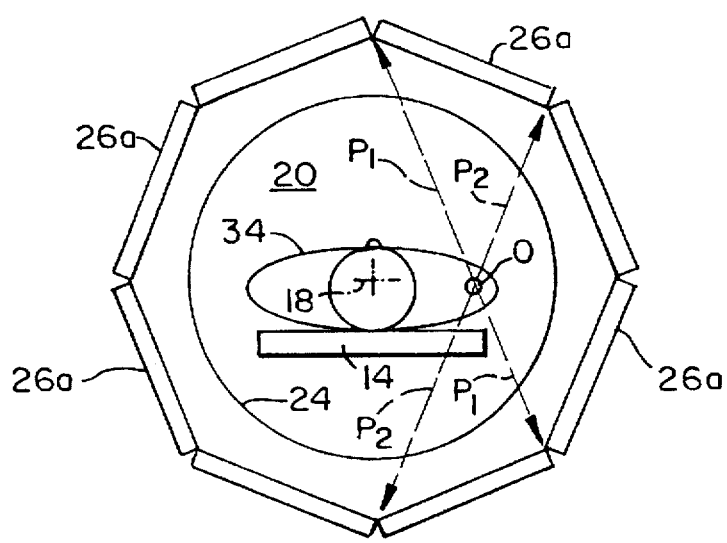
FIGS. 2A and 2B are cross-sectional views of prior art PET scanner apparati, and show various arrangements of detector units in accordance with the prior art.

As is known from the prior art, and referring now to FIG. 2A (which is a cross-sectional view taken roughly along a line corresponding to the line 3—3 of FIG. 1), a number of emission detector units 26 (26a in FIG. 2A) may be positioned within the detection gantry 22 around the axial periphery 24 of the detection chamber 20 to substantially surround or enclose the detection chamber 20. As shown in FIG. 2A, the number of detector units 26a is eight, although the use of lesser and greater numbers of detector units 26 is also known.

As should be evident, if a positron annihilation event occurs at any origin O within the detection chamber 20 of FIG. 2A, the two opposing photons emitted as a result of the event (as represented by the path $P_1$ or the path $P_2$) can be detected by one of the detector units 26a surrounding the detection chamber 20. Moreover, and as should be understood, the efficiency of such detection does not depend upon the position of the origin O within the detection chamber 20.

However, one skilled in the art will appreciate that each detector unit 26a is relatively costly, and will also appreciate that the cost of surrounding a detection chamber 20 with such detector units 26a can therefore be quite substantial. Moreover, one skilled in the art will recognize that the detection chamber 20 need not be completely surrounded or enclosed by detector units 26 for the apparatus 10 to function.

Figure 2B:
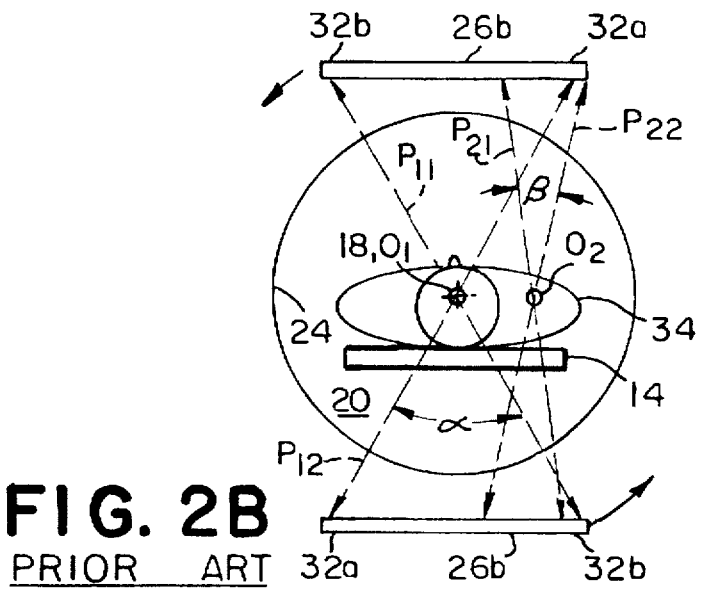

For example, and referring now to FIG. 2B (which is a cross-sectional view taken roughly along a line corresponding to the line 3—3 of FIG. 1), it is known that the apparatus 10 may be operated with only two opposingly situated detector units 26b, one on each side of the detection chamber 20. As seen in FIG. 2B, each of the two detector units 26b has an arcual length of about 60 degrees with respect to the detection chamber 20, with the result that an arcual length of about 240 degrees around the detection chamber 20 is not enclosed (i.e., covered by a detector unit 26a). Although photons that originate from events within the detection chamber 20 may not always be detected because of such incomplete enclosure, it will be appreciated that enough such photons are detected, assuming that an adequate number of photons are emitted. As is known, and as shown in FIG. 2B, the quality of the dataset collected by the detector units 26b may be improved by synchronously rotating the detector units 26b around the axial center line 18 of the detection chamber so that representative samples of photons emitted in all directions are detected.

However, since the two detector units 26b are substantially opposingly situated, as seen in FIG. 2B, one skilled in the art will appreciate that detector efficiency for any particular region within the detection chamber 20 decreases the farther such region is from the axial center line 18 of the detection chamber 20. Specifically, and as shown, if an event occurs at an origin $O_1$ substantially coincident with the axial center line 18, the path of the photons emitted from such event can extend over a range of detection defined by an angle $\alpha$ between two extreme detectable paths $P_{11}$, $P_{12}$. As should be appreciated from viewing FIG. 2B, and assuming the detector units 26b are tangentially positioned and centered with respect to the axial center line 18, the extreme paths $P_{11}$, $P_{12}$ are defined by the circumferential edges 32a, 32b of each of the detector units 26b and by the origin $O_1$. In particular, if the path of photons produced by an event at the origin $O_1$ is between the extreme paths $P_{11}$, $P_{12}$, both photons should enter and be detected by the detector units 26b.

However, if an event occurs at an origin $O_2$ away from the axial center line 18 of the detection chamber 20, as also seen in FIG. 2B, the path of the photons emitted from such event can only extend over a smaller range of detection defined by an angle $\beta$ between two extreme detectable paths $P_{21}$, $P_{22}$. angle $\beta$ being less than angle $\alpha$. As shown, the extreme path $P_{21}$ is defined by the edge 32b of the lower detector unit 26b and by the origin $O_2$, and the extreme path $P_{22}$ is defined by the edge 32a of the upper detector unit 26b and by the origin $O_2$. Importantly, although one of a pair of photons from an event at the origin $O_2$ may enter and be detected by one of the detector units 26b, if the path of the pair is outside the extreme paths $P_{21}$, $P_{22}$, the other of the pair will not enter and be detected by the other detector unit 26b. Since both photons are not detected, the event is not recorded. As may be appreciated, then, detection efficiency of any event at an origin O is directly related to the extreme path range angle $\alpha$, $\beta$, etc. at the origin O. More specifically, for the opposingly situated detector units 26b of FIG. 2B, detection efficiency decreases the farther away a region is from the axial center line 18 of the detection chamber 20.

Figure 3A:
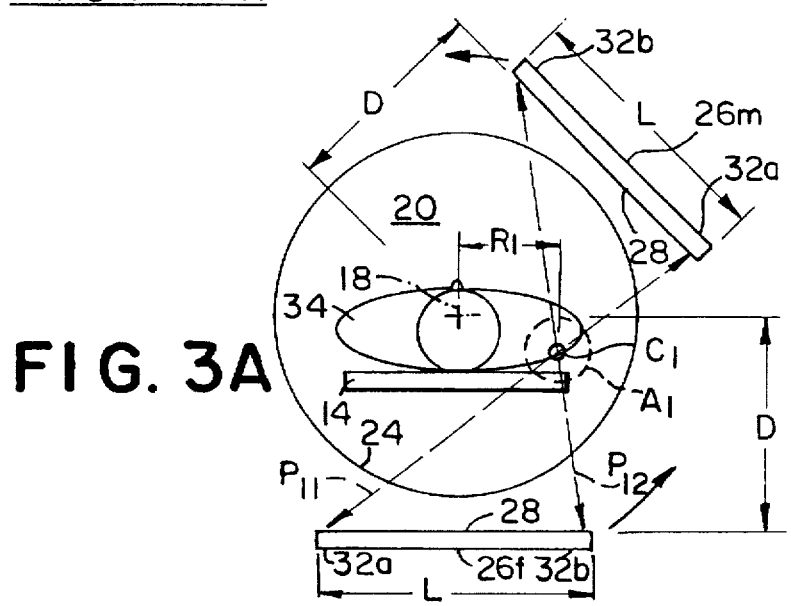
FIGS. 3A and 3B are cross-sectional views of the apparatus taken along line 3—3 of FIG. 1, and show various arrangements of detector units in accordance with a first preferred embodiment of the present invention.

In the first preferred embodiment of the present invention, and referring now to FIG. 3A, the problems associated with the opposingly situated detector units 26b of FIG. 2B are alleviated by employing a plurality of (i.e., two or more) positron emission detector units 26f, 26m in a coincidence detection scanner, where each detector unit 26f, 26m is circumferentially movable about the axial periphery 24 of the detection chamber 20, and where at least one of the detector units 26m is independently movable with respect to any other detector unit 26f such that the detector face 28 of the detector unit 26m is at an adjustable oblique angle with respect to the detector face 28 of the detector unit 26f. Preferably, one or more motor drives (not shown) is/are employed to move the detector units 26f, 26m.

Figure 5:
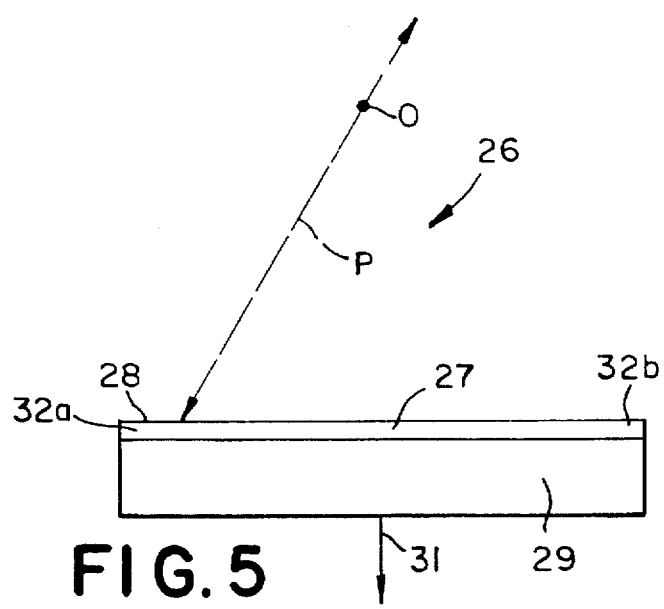
FIG. 5 is a more detailed cross-sectional view of one of the detector units shown in FIG. 3A.

As seen in FIG. 5, each detector unit 26f, 26m preferably includes at least one detecting crystal 27 having a detection surface or face 28 oriented toward the detection chamber 20. Each detection face 28 includes first and second opposing circumferential edges 32a, 32b, where each edge 32a, 32b is substantially parallel to the axial center line 18 (not shown in FIG. 5) of the detection chamber 20. As should be evident, then, when a photon originates from within the detection chamber 20 at an origin O, travels along a path P, and enters the detecting crystal 27 at a particular region, the detecting crystal 27 becomes excited in such region. Preferably, each detector unit 26f, 26m also includes sensing circuitry 29 adjacent the detecting crystal 27 for sensing photon excitations and for producing appropriate electrical signals 31 based on sensed photons.

Referring now to FIG. 1, it is preferable that the apparatus 10 of the present invention also includes a detection circuit 25 operatively coupled to each detector unit 26 within the detection gantry 22 to receive the electrical signals 31. As should be understood, based on the electrical signals 31, the detection circuit 25 develops PET scanner imaging information relating to one or more planar images of a portion of the body 34.

Preferably, the apparatus 10 further includes a controller 23 for controlling the operation thereof, including the operation of the various motor drives, the detection gantry 22, each detector unit 26 including the sensing circuitry 29, and the detection circuit 25. Since the sensing circuitry 29, the detection circuit 25, the controller 23, and the methodology for producing the planar images are known, no further details are believed necessary in this regard. Moreover, one skilled in the art will recognize that such sensing circuitry 29, such detection circuit 25, such controller 23, and such methodology may be any appropriate sensing circuitry, detection circuit, controller and methodology without departing from the spirit and scope of the present invention.

Referring now to FIG. 3A, the plurality of detector units 26f, 26m preferably comprises a first detector unit 26f that is circumferentially movable about the axial periphery 24 of the detection chamber 20, and a second detector unit 26m that is circumferentially movable in a fixed relationship with the first detector unit 26f about the axial periphery 24 of the detection chamber 20 such that the detector face 28 of the second detector unit 26m is at an oblique angle with respect to the detector face 28 of the first detector unit 26f. Preferably, the first and second detector units 26f, 26m define therebetween an area A ($A_1$ as shown in FIG. 3A) having a detection efficiency above a predetermined minimum detection efficiency (i.e. a "high detection efficiency").

As should be understood, then, the area A has a center C ($C_1$ as shown in FIG. 3A) and is circumferentially movable in a fixed relationship with the first and second detector units 26f, 26m. As seen, the center $C_1$ of the area $A_1$ is offset a predetermined radial distance $R_1$ from the axial center line 18 of the detection chamber 20. More specifically, and as seen in FIG. 3A, the center $C_1$ may be defined as the intersection of paths $P_{11}$, $P_{12}$, where each path $P_{11}$, $P_{12}$ extends from one end 32a, 32b of one detector unit 26f, 26m to the cater corner (i.e., diagonally opposite) end 32a, 32b of the other detector unit 26f, 26m. As may be understood, such center $C_1$ is geometrically afforded the widest range of detection based on the current positional relationship between the first and second detector units 26f, 26m.

As one skilled in the art will appreciate, although the area $A_1$ is generally shown in FIG. 3A as circular, such area $A_1$ is not, in fact, likely to be circular. Generally, it should be understood that the area $A_1$ is a zone in the neighborhood of the center $C_1$ wherein the detection efficiency is relatively high based on the current positional relationship between the first and second detector units 26f, 26m.

As seen in FIG. 3A, the respective circumferential lengths L of the detector units 26f, 26m are approximately equal and the distances D from the detector units 26f, 26m to the axial center line 18 of the detection chamber 20 are also approximately equal. Accordingly, and absent other non-geometric factors, no matter what oblique angle the detection face 28 of the first detector unit 26f is oriented with respect to the detection face 28 of the second detector unit 26m, the center $C_1$ of the area $A_1$ is substantially equidistant from the detector units 26f, 26m. Nevertheless, one skilled in the art will recognize that different length L detector units 26f, 26m may be employed, and that the detector units 26f, 26m may be spaced different distances D from the axial center line 18 of the detection chamber 20 without departing from the spirit and scope of the present invention.

Moreover, although only a single pair of detector units 26f, 26m is shown in FIG. 3A, other numbers of detector units 26f, 26m may be employed without departing from the spirit and scope of the present invention. For example, the apparatus 10 may employ three, four, five, or even up to eight or more detector units 26f, 26m.

Figure 3B:
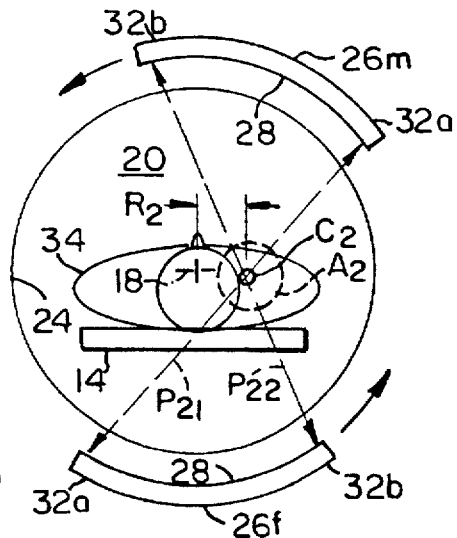

As seen in FIG. 3A, in the first preferred embodiment of the present invention, each detector unit 26f, 26m may have a flat detection face 28. However, and as shown in FIG. 3B, each detector unit 26f, 26m may alternatively have a curved detection face 28. As should be understood, such a curved detection face 28 does not substantively alter the geometrical basis of the present invention.

In FIG. 3A, the detector face 28 of the second detector unit 26m is at a more severe oblique angle of about 45 degrees with respect to the detector face 28 of the first detector unit 26f. In FIG. 3B, the detector face 28 of the second detector unit 26m is at a less severe oblique angle of about 20 degrees with respect to the detector face 28 of the first detector unit 26f. As seen by comparing FIGS. 3A and 3B, by moving to a less severe oblique angle, the center $C_2$ of the area $A_2$ has been moved closer to the axial center line 18, as represented by the radial distance $R_2$ of FIG. 3B which is smaller than the radial distance $R_1$ of FIG. 3A. Correspondingly, and as should now be understood, an area A centered at a center C may be moved farther away from the axial center line 18 of the detection chamber 20 by moving the detector unit 26m of FIG. 3A to a more severe oblique angle.

Since the detector units 26f, 26m are synchronously circumferentially moving around the axial periphery 24 of the detection chamber 20 during operation of the apparatus 10, and since the area A moves in a fixed relationship with the first and second detectors 26f, 26m, it should be understood that the movement of the area A generally traces out a circle or "donut" within the detection chamber 20. Thus, during rotation, the circle or donut represents an area of high detection efficiency centered around the axial center line 18 of the detection chamber 20. Importantly, in the present invention, the area of high detection efficiency of the apparatus 10 is removed or offset from the area around the axial center line 18 and toward the axial periphery 24 of the detection chamber 20. While it is true that the increased efficiency away from the axial center line 18 is accompanied by decreased efficiency near the axial center line 18, one skilled in the art will recognize that such a side effect is acceptable since the efficiency around the axial center line 18 is already high.

In the first preferred embodiment of the present invention, an offset high detection efficiency area A is achieved by obliquely angling one detector unit 26 with respect to another detector unit 26. In a second preferred embodiment of the present invention, and referring now to FIGS. 4A–4E, such a result is achieved by offsetting the resting surface 14 with respect to the axial center line 18 of the detection chamber 20. Accordingly, although the area A of high detection efficiency is centered at the axial center line 18 because the detector units 26 of FIGS. 4A–4E are substantially parallel, the body 34 is moved in an offset manner through such area A by circumferentially moving the resting surface 14 with respect to the axial center line 18 of the detection chamber 20.

Figure 4A:
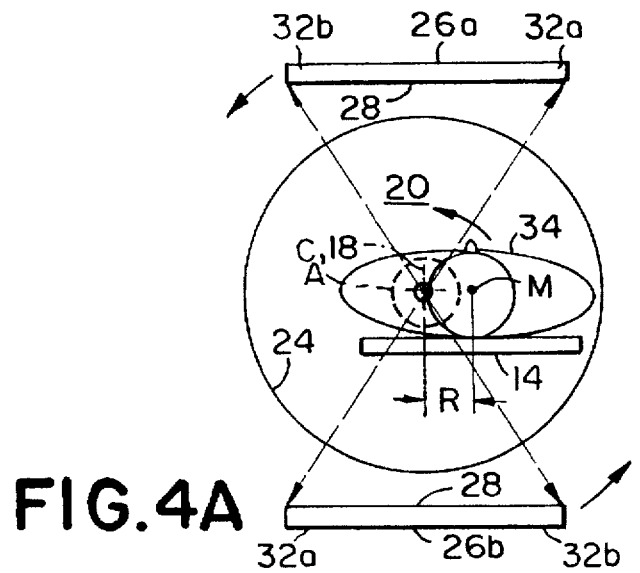
FIGS. 4A–4E are cross-sectional views of the apparatus taken along line 3—3 of FIG. 1, and show various positions of the detector units and of a patient resting surface in accordance with a second preferred embodiment of the present invention.
Figure 4B:
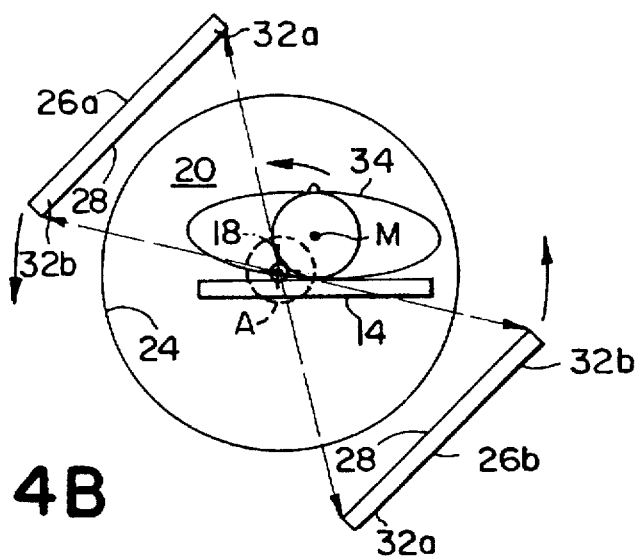
Figure 4C:
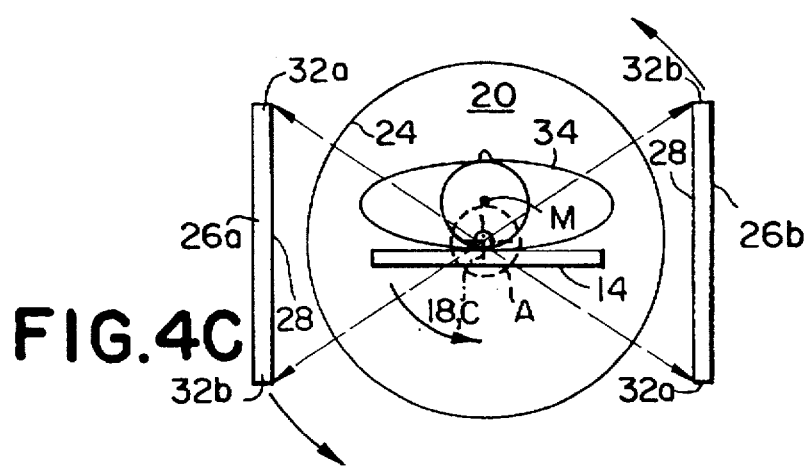
Figure 4D:
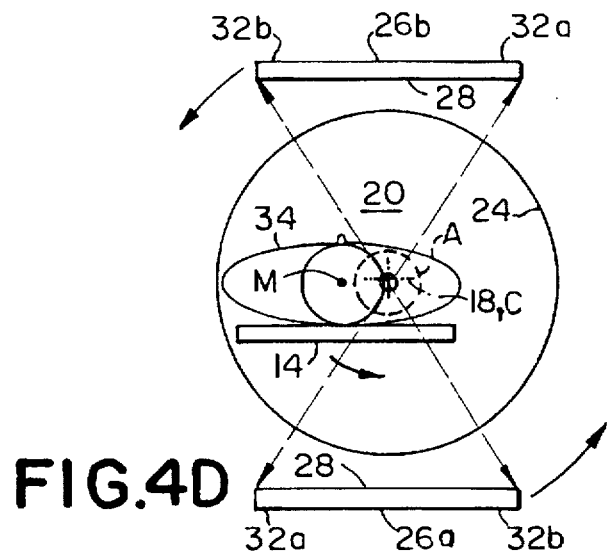
Figure 4E:
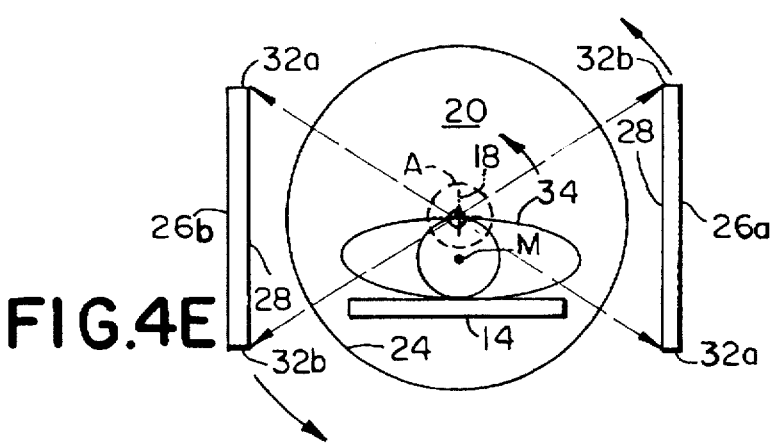

More specifically, and referring now to FIG. 4A, in the second preferred embodiment of the present invention, the axial midpoint M of the body 34 is offset from the axial center line 18, which is also the center C of the area A of peak detection efficiency. Such offsetting occurs by proper positioning of the resting surface 14. Moreover, and referring now to FIGS. 4B–4E, by circumferentially moving the resting surface 14 with respect to the axial center line 18 of the detection chamber 20, the area A of high detection efficiency is moved through a majority of the body 34. Preferably, the apparatus 10 includes an appropriate motor drive (not shown) under the control of the controller 23 to move the resting surface 14.

Preferably, and as seen in FIGS. 4A–4E the resting surface 14 is moved such that the axial midpoint M of the body 34 is substantially always at the same distance R from the axial center line 18. Alternatively, the resting surface 14 may be moved such that the axial midpoint M of the body 34 traces out a horizontally flattened oval. Preferably, while being circumferentially moved, the resting surface 14 continually faces substantially upward. Otherwise, the body 34 resting on the resting surface 34 would fall out absent any restraining devices.

Preferably, and as shown in FIGS. 4A–4E, the detector units 26a, 26b rotate around the axial center line 18 of the detection chamber in a fixed relationship with the circumferential movement of the resting surface 14. For example, in FIG. 4A, the axial midpoint M of the body 34 is at about 0 degrees and the detector unit 26a is at about 90 degrees with respect to the axial center line 18. Similarly, in FIG. 4B, the axial midpoint M of the body 34 is at about 45 degrees and the detector unit 26a is at about 135 degrees, and in FIG. 4E, the axial midpoint M of the body 34 is at about 270 degrees and the detector unit 26a is at about 0 degrees. However, one skilled in the art will recognize that the detector units 26a, 26b may move in a non-fixed relationship with respect to the resting surface 14 without departing from the spirit and scope of the present invention.

As seen in FIGS. 4A–4E, the detection faces 28 of the detector units 26a, 26b are substantially parallel and substantially flat. However, and consistent with the first embodiment of the present invention as seen in FIGS. 3A and 3B, one skilled in the art will recognize that the detection faces 28 may also be curved and may also be at an oblique angle with respect to each other without departing from the spirit and scope of the present invention. Additionally, although the detector units 26a, 26b in FIGS. 4A–4E are shown as having substantially equal lengths and as being substantially the same distance away from the axial center line 18, one skilled in the art will also recognize that non-equal distances and/or non-equal lengths may also be employed without departing from the spirit and scope of the present invention.

Normally, it is expected that in either of the preferred embodiments of the present invention described above, the detector units 26 moves in a fixed relationship with respect to each other around the axial periphery 24 of the detection chamber 20 during dataset collection (i.e. during operation to produce an image), and that any independent movement of one detector unit 26 with respect to another detector unit 26 occurs during other times (i.e. during a set up period). However, one skilled in the art will appreciate that compound movement of the detector units 26 with respect to each other and with respect to the detection chamber 20 during dataset collection may be desirable and is, therefore, within the spirit and scope of the present invention.

Preferably, and in any embodiment of the present invention, the detection chamber 20 is cylindrical. However, one skilled in the art will recognize that the detection chamber 20 may have other shapes while still being within the spirit and scope of the present invention. For example, the detection chamber 20 may be substantially oval in a cross-section taken along line 3—3 of FIG. 1, as well as other appropriate shapes.

Preferably, and in any embodiment of the present invention, each detector unit 26 is a positron-emission detector unit. As one skilled in the art will appreciate, the detecting crystal 27 at the detection face 28 of a positron-emission detector unit 26 is especially attuned to sense positron-emitted photons entering the detecting crystal 27. Preferably, each positron-emission detector unit 26 includes an NaI(Tl) scintillation crystal, although other similar crystals (such as BGO, for example) and other detecting elements may be employed without departing from the spirit and scope of the present invention. Preferably, enough $^{18}$F-FDG is employed to cause an adequate amount of photons to be emitted. However, one skilled in the art will recognize that other appropriate photon-resulting substances may be employed without departing from the spirit and scope of the present invention.

From the foregoing description, it can be seen that the present invention comprises a new and useful apparatus for coincidence detecting positron-emissions in a PET scanner, where an area of high detection efficiency within the apparatus is offset from the axial midpoint of a body within a detection chamber. It will be appreciated by those skilled in the art that the arrangements shown in the accompanying drawings and described above, if appropriately configured, may also be employed with other types of scanners without departing from the spirit and scope of the present invention. Moreover, it will be appreciated by those skilled in the art that changes can be made to the embodiments described above without departing from the broad inventive concepts thereof. For example, single-photon detection imaging may be performed with the scanner of the present invention, assuming that collimators or other similar devices are employed. It is understood, therefore, that this invention is not limited to the particular embodiments disclosed but is intended to cover modifications within the spirit and scope of the present invention as defined by the appended claims.

I claim:

1. A positron emission coincidence detection scanner comprising:
   a detection chamber having an axial center line and an axial periphery;
   a positron emission coincidence detection circuit; and
   a plurality of positron emission detector units positioned around the axial periphery of the detection chamber, each detector unit being operatively coupled to the detection circuit and having a detection face oriented toward the detection chamber, each detector unit being circumferentially movable about the axial periphery of the detection chamber, at least one of the detector units being independently movable with respect to any other detector unit.

2. The positron emission coincidence detection scanner of claim 1 wherein each emission detector unit has at least one detecting crystal.

3. The positron emission coincidence detection scanner of claim 2 wherein each emission detector unit has a single detecting crystal.

4. The positron emission coincidence detection scanner of claim 1 wherein the plurality of detector units comprises:
   a first detector unit circumferentially movable about the axial periphery of the detection chamber; and
   a second detector unit circumferentially movable in a fixed relationship with the first detector unit about the axial periphery of the detection chamber, the first and second detector units defining therebetween an Area A having a detection efficiency above a predetermined minimum detection efficiency, the Area A having a center and being circumferentially variable in a fixed relationship with the first and second detector units, the center of the Area A being offset a predetermined distance from the axial center line of the detection chamber.

5. The positron emission coincidence detection scanner of claim 4 wherein each emission detector unit has a single detecting crystal.

6. The positron emission coincidence detection scanner of claim 4 wherein the detection face of the first detector unit is oriented at an oblique angle with respect to the detection face of the second detector unit.

7. The positron emission coincidence detection scanner of claim 6 wherein the center of the area A is substantially equidistant from the first and second detector units.

8. The positron emission coincidence detection scanner of claim 1 wherein the scanner comprises a single pair of detector units.

9. The positron emission coincidence detection scanner of claim 1 wherein the scanner comprises two to eight detector units.

10. The positron emission coincidence detection scanner of claim 1 wherein the detection face of each detecting crystal is curved along the axial periphery of the detection chamber.

11. A positron emission coincidence detection scanner comprising:
    a detection chamber having an axial center line and an axial periphery;
    a positron emission coincidence detection circuit;
    a resting surface at least partially positioned within the detection chamber, the resting surface extending substantially parallel to the axial center line of the detection chamber and being radially movable with respect to the axial center line of the detection chamber, the resting surface being circumferentially movable with respect to the axial center line of the detection chamber while continuously facing substantially upward; and
    a plurality of positron emission detector units positioned around the axial periphery of the detection chamber, each detector unit being operatively coupled to the detection circuit and having a detection face oriented toward the detection chamber.

12. The positron emission coincidence detection scanner of claim 11 wherein each detector unit is circumferentially movable about the axial periphery of the detection chamber.

13. The positron emission coincidence detection scanner of claim 12 wherein at least one of the detector units is independently movable with respect to any other detector unit.

14. The positron emission coincidence detection scanner of claim 12 wherein the plurality of detector units comprises:
    a first detector unit circumferentially movable about the axial periphery of the detection chamber; and
    a second detector unit circumferentially movable in a fixed relationship with the first detector unit about the axial periphery of the detection chamber, the first and second detector units defining therebetween an Area A having a detection efficiency above a predetermined minimum detection efficiency, the Area A having a center and being circumferentially variable in a fixed relationship with the first and second detector units, the center of the Area A being offset a predetermined distance from the axial center line of the detection chamber.

15. The positron emission coincidence detection scanner of claim 14 wherein the detection face of the first detector unit is oriented substantially parallel with respect to the detection face of the second detector unit.

16. The positron emission coincidence detection scanner of claim 15 wherein the center of the area A is substantially equidistant from the first and second detector units.

17. The positron emission coincidence detection scanner of claim 14 wherein the detection face of the first detector unit is oriented at an oblique angle with respect to the detection face of the second detector unit.

18. The positron emission coincidence detection scanner of claim 11 wherein each emission detector unit has at least one detecting crystal.

19. The positron emission coincidence detection scanner of claim 18 wherein each emission detector unit has a single detecting crystal.

20. The positron emission coincidence detection scanner of claim 11 wherein the scanner comprises a single pair of detector units.

21. The positron emission coincidence detection scanner of claim 11 wherein the scanner comprises two to eight detector units.

22. The positron emission coincidence detection scanner of claim 11 wherein the detection face of each detecting crystal is curved along the axial periphery of the detection chamber.

23. A positron emission coincidence detection scanner comprising:
    a detection chamber having an axial center line and an axial periphery;
    a positron emission coincidence detection circuit; and a single pair of positron emission detector units positioned around the axial periphery of the detection chamber, each detector unit having a detection face oriented toward the detection chamber, each detector unit being operatively coupled to the detection circuit, each detector unit being circumferentially movable about the axial periphery of the detection chamber and being fixedly positioned with respect to the other detector unit, the detection face of each unit being oriented at an oblique angle with respect to the detection face of the other detector unit.

24. The positron emission coincidence detection scanner of claim 23 wherein each emission detector unit has at least one detecting crystal.

25. The positron emission coincidence detection scanner of claim 24 wherein each emission detector unit has a single detecting crystal.

26. The positron emission coincidence detection scanner of claim 23 wherein the single pair of detector units comprises a first detector unit and a second detector unit defining therebetween an Area A having a detection efficiency above a predetermined minimum detection efficiency, the Area A having a center and being circumferentially variable in a fixed relationship with the first and second detector units, the center of the Area A being offset a predetermined distance from the axial center line of the detection chamber.

27. The positron emission coincidence detection scanner of claim 23 wherein the detection face of each detecting crystal is curved along the axial periphery of the detection chamber.

28. The positron emission coincidence detection scanner of claim 23 further comprising an additional positron emission detector unit positioned at the axial periphery of the detection chamber, the additional detector unit having a detection face oriented toward the detection chamber and being operatively coupled to the detection circuit, the additional detector unit being circumferentially movable about the axial periphery of the detection chamber and being fixedly positioned with respect to the other detector units, the detection face of the additional detector unit being oriented at an oblique angle with respect to the detection face of at least one other detector unit.

* * * * *